United States Patent [19]
Dunn et al.

[11] 3,968,098
[45] July 6, 1976

[54] ISOLATION PROCESS FOR WATER-SOLUBLE DYES

[75] Inventors: Anthony Kenneth Dunn; David Hugh Spence; Bryan Stockton, all of Manchester, England

[73] Assignee: Imperial Chemical Industries Limited, London, England

[22] Filed: June 6, 1974

[21] Appl. No.: 476,941

Related U.S. Application Data

[63] Continuation of Ser. No. 318,086, Dec. 18, 1972, abandoned.

[52] U.S. Cl. .............................. 260/208; 260/163; 260/195; 260/200
[51] Int. Cl.² ........................................ C09B 46/00
[58] Field of Search ............ 260/208, 163, 195, 200

[56] References Cited
UNITED STATES PATENTS 2,564,225  8/1951  Mayers ........................... 260/208 X
3,483,183  12/1969  Inglemann .......................... 260/208
3,575,957  4/1971  Demler ............................. 260/208 X Primary Examiner—Charles F. Warren
Attorney, Agent, or Firm—Cushman, Darby & Cushman

[57] ABSTRACT

A process for the isolation of a water-soluble solid from a mixture containing said solid and an aqueous solution of water-soluble impurity, said process comprising displacing the aqueous solution from the mixture by washing with a water-miscible organic solvent, slurrying the resulting mixture of water-soluble solid and solvent with water, removing the solvent by steam distillation and finally subjecting the resulting aqueous solution or suspension to spray drying.

4 Claims, No Drawings

ISOLATION PROCESS FOR WATER-SOLUBLE DYES

This is a continuation of application Ser. No. 318,086, filed Dec. 18, 1972, now abandoned.

This invention relates to an isolation process and more particularly to a process for the isolation of water-soluble solids from mixtures containing impurities.

In chemical manufacturing processes it is often the case that a water-soluble product is obtained in an impure form, the impurities being other water-soluble materials. Methods that have been proposed for separating the product from the impurities depend to a large extent on their relative solubilities in water. The present invention is concerned with the case where the product is in fact contaminated with an aqueous solution of impurity. This situation commonly occurs in the manufacture of water-soluble dyes which are usually 'salted-out' of aqueous solution by the addition of an inorganic salt such as sodium chloride. Filtration of the aqueous mass produces a paste consisting of solid dye contaminated with aqueous salt solution. In many cases, the presence of salt in the dried paste is not objectionable but in other cases, for example in the production of foodstuff colors, it is desirable that the product should be of a very high purity.

Accordingly, the present invention provides a process for the isolation of a water-soluble solid from a mixture containing said solid and an aqueous solution of water-soluble impurity, said process comprising displacing the aqueous solution from the mixture by washing with a water-miscible organic solvent, slurrying the resulting mixture of water-soluble solid and solvent with water, removing the solvent by steam distillation and finally subjecting the resulting aqueous solution or suspension to spray drying.

The process of the invention is particularly suitable for the isolation of water-soluble dyes from aqueous solutions of inorganic salts, especially the salts used to precipitate the dyes from aqueous solution at the end of manufacture. The water-soluble dyes usually contain one or more sulphonic acid and/or carboxylic acid groups which are usually present in salt form especially as alkali metal salts. The inorganic salt used for precipitating the dyes is most commonly sodium chloride but other salts such as sodium sulphate or potassium chloride may be used.

The water-miscible solvent used to displace the aqueous solution from the mixture should have a boiling point below 200°C at atmospheric pressure and is preferably a lower alkanol such as methanol, ethanol, isopropanol, n-propanol or n-butanol.

In order to ensure efficient removal of impurity with the minimum amount of solvent it is generally preferred to use a mixture of water-miscible solvent and water. Such mixtures should contain at least 25% by weight of solvent. In any particular case, the most suitable water content for such a mixture depends upon the respective solubilities of the main product and the impurity in the mixture of solvent and water and also upon the concentration of impurity in the aqueous solution with which the product is associated. The most suitable composition for the solvent/water mixture can simply be found by trial.

In all cases it is important that the water-soluble solid being isolated is not appreciably soluble in the organic solvent or solvent/water mixture used to displace the aqueous solution of impurity.

It is convenient to carry out the washing procedure on a filter press, the desired water-soluble solid being present on the press as an aqueous paste or cake. In the case of a press cake containing a water-soluble dye contaminated with brine mother liquor it has been found particularly convenient to displace the mother liquor by a mixture of isopropanol and water, a mixture containing about 70–80% of isopropanol being especially suitable.

After washing, the water-soluble solid, which is then contaminated with organic solvent, is slurried with water and the solvent is removed by steam distillation using any of the steam distillation techniques that have been described in the prior art. Distillation is continued until the solvent content of the issuing vapors has reached a desired low level.

The water-soluble solid which is then largely present in aqueous solution form, although some may be suspended in the aqueous phase depending upon its solubility, is finally isolated by spray drying using any of the spray drying techniques that have been described in the prior art.

The products obtained by the process of the invention are free-flowing powders of very high purity. Accordingly, the process is particularly useful for the isolation of edible dyes used in the coloration of foodstuffs.

The invention is illustrated but not limited by the following Example in which all percentages are by weight.

EXAMPLE 1

The filter cake obtained by filtering the suspension of FD & C Yellow No. 6 (CI Food Yellow 3), produced by salting the color solution from the normal azo dyestuff and foodstuff color manufacturing method for this dyestuff, contains about 45% by weight of solids (by drying) and contains brine of about 7% salt content. This filter cake is washed in the filter with a water/isopropanol solution containing 75% isopropanol until the salt content of the filtrate is less than 0.2%. This requires a volume of isopropanol/water for the wash equal to between 2 and 3 times the volume of the filter cake. The filter cake is then blown with nitrogen to remove as much liquor as practicable.

The filtrate is then fed to a continuous distillation column heated by steam injection and capable of producing distillate of 85% isopropanol content. The liquor from the columns, virtually free from isopropanol, is discarded.

The dyestuff filter cake is discharged from the filter to a vessel and boiled at atmospheric pressure by live steam injection, the vapor being condensed and distillate collected, until the vapor temperature has risen to near 100°C indicating a very low isopropanol content in the vapour.

The resulting hot aqueous solution of the dyestuff in the vessel is fed to a spray dryer and dried.

The distillates from the filtrate and cake distillations are mixed and the water content adjusted to 25% by adding water. This is then available for use for further washing.

By the normal process, whereby a filter cake containing brine is dried, the salt content of the product is about 4%. The product obtained as described above has a salt content of about 0.7%.

EXAMPLE 2

Washing of the filter cake of FD & C Yellow No. 5 (CI Food Yellow 4) as for example 1, but with a proportionately larger volume of solvent, gives a salt content of 0.07% compared to 4% by the normal process.

EXAMPLE 3

Washing of the filter cake of FD & C Red No. 2 (CI Food Red 9) as for example 1, gives a salt content of 0.4% compared to 4–5% by the normal process.

EXAMPLE 4

56 Parts of a filter cake obtained by filtering 500 parts of the suspension of CI Food Red 7 produced by salting the color solution from the normal azo dyestuff and foodstuff color manufacturing method, contains about 48% by weight of solids including 6.1% of salt. This cake is washed through with 80 parts of 1-propanol, thereby reducing the salt content in the filter cake to 2.0%.

EXAMPLE 5

As example 4, but washing through with 80 parts 2-propanol reduces the salt content to 0.45% on filter cake.

EXAMPLE 6

As example 4, but washing through with 83 parts of 75% aqueous 2-propanol reduces the salt content to 0.2% on filter cake.

We claim:

1. A process for the isolation of a water-soluble dye containing one or more groups selected from sulfuric acid and carboxylic acid groups from an aqueous paste containing said dye and an inorganic salt, said process comprising
   a. washing said paste with a water-miscible lower alkanol to displace an aqueous solution of an inorganic salt therefrom;
   b. slurrying the resulting washed paste with water;
   c. subjecting the resulting slurry to steam distillation to remove the lower alkanol therefrom; and
   d. subjecting the aqueous distillation residue resulting from (c) to spray drying so as to recover said dye.

2. The process as claimed in claim 1 wherein said inorganic salt is sodium chloride.

3. The process as claimed in claim 1 wherein said water-miscible lower alkanol employed to wash said paste is admixed with water, the resulting mixture containing at least 25% by weight of said water-miscible lower alkanol.

4. The process as claimed in claim 1 wherein said aqueous paste consists of a mixture of said water-soluble dye and sodium chloride and said aqueous paste is washed with isopropanol to which water has been added.

* * * * *

UNITED STATES PATENT OFFICE
CERTIFICATE OF CORRECTION

Patent No. 3,968,098    Dated July 6, 1976

Inventor(s) Anthony Kenneth Dunn, David Hugh Spence & Bryan Stockton

It is certified that error appears in the above-identified patent and that said Letters Patent are hereby corrected as shown below:

In the heading, under [63] related U. S. Application Data "Ser. No. 318,086" should read:

--Ser. No. 316,086--

Col. 1, line 6, "318,086" should read:

--316,086--

Signed and Sealed this

First Day of March 1977

[SEAL]

Attest:

RUTH C. MASON
Attesting Officer

C. MARSHALL DANN
Commissioner of Patents and Trademarks